Jan. 18, 1949.   C. C. DYBVIG   2,459,750
TIRE TREAD
Filed July 30, 1945
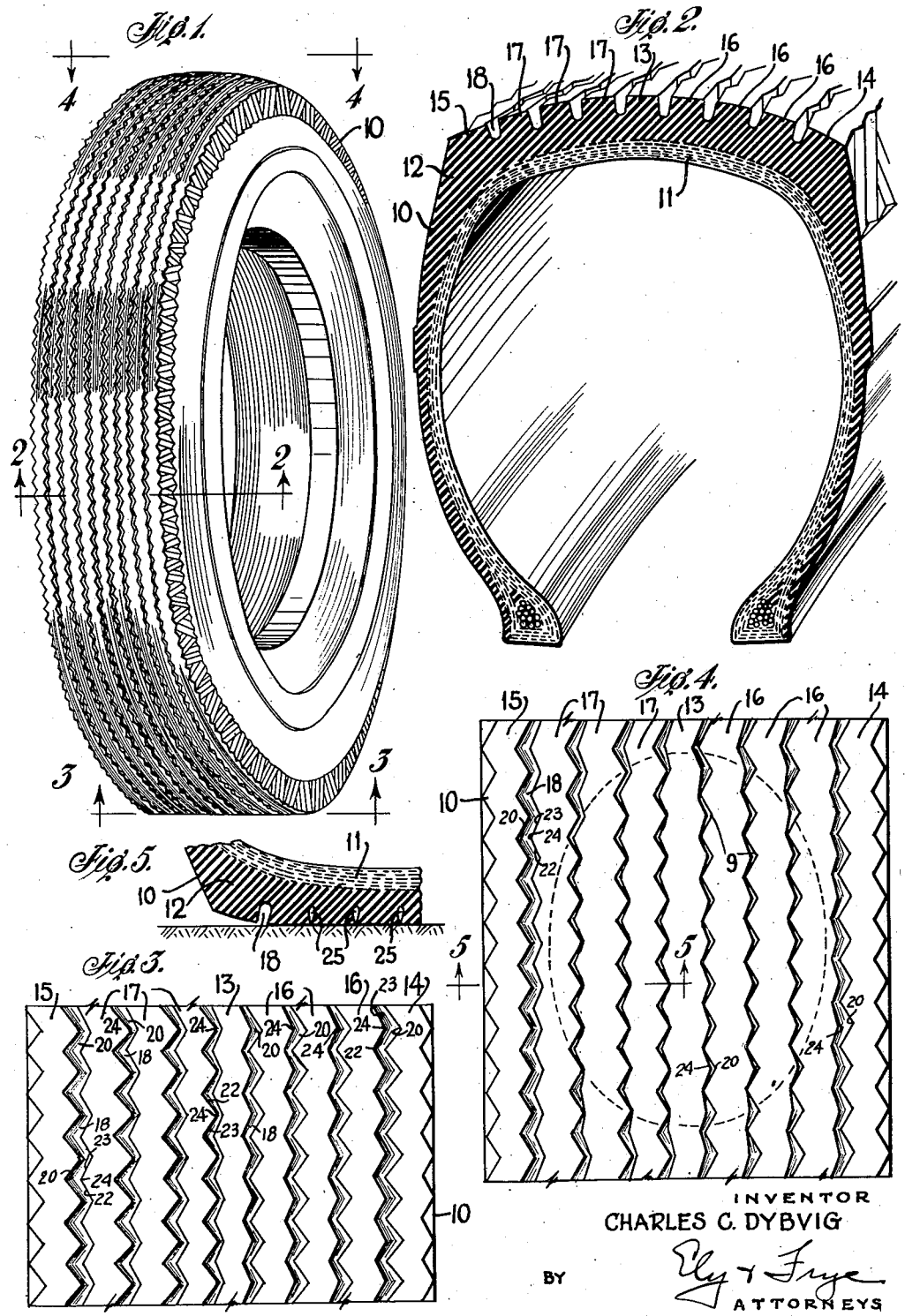
INVENTOR
CHARLES C. DYBVIG
BY
Ely & Frye
ATTORNEYS Patented Jan. 18, 1949

2,459,750

UNITED STATES PATENT OFFICE 2,459,750

TIRE TREAD

Charles C. Dybvig, Birmingham, Mich., assignor to The Firestone Tire & Rubber Company, Akron, Ohio, a corporation of Ohio Application July 30, 1945, Serial No. 607,809

3 Claims. (Cl. 152—209)

This invention relates to improvements in treads for non-metallic tires and in particular concerns improvements in treads of pneumatic tires molded from rubber or rubber like materials.

The treads of such tires are commonly formed with a pattern comprising up-standing ribs and/or a plurality of studs each of which pattern units presents a working surface to that of the road. The present invention is illustrated by reference to a continuous rib tire; however, it is to be understood that the invention is not to be limited to such continuous ribs, but that in their stead a series of broken ribs, or elongated lugs, may be used without departing from the spirit of the invention. While the tread embodying the present invention has been designed with its esthetic appeal considered, its mechanical function is of primary concern.

An object of the present invention is to provide improved traction.

Another object of the invention is to provide an effective non-skid tread in which tread wear is less than in treads heretofore known which provide comparable traction.

A further object of the invention is to provide an effective non-skid tread that is quiet in service.

A still further object of the invention is to provide a tread adapted to eject pebbles.

Another object of the invention is to provide an effective non-skid tread that is quiet and stable.

Another object of the invention is to provide a tread having grooves between non-skid tread elements, the tread being so constructed as to prevent the closing of the grooves at predetermined intervals along the grooves and along the bottoms of the grooves when said tread is under load.

Still another object of the invention is to provide a tread that prevents excessive lateral movement of the tread.

Yet another object of the invention is to provide a grooved tread that will not close at predetermined intervals along the grooves thereby providing recesses into which water trapped between the tread and the road may flow, and to provide means for the escape of water at the bottom of the recesses whereby actual contact between the tread and road surface is assured even during a hard rain storm.

Referring to the drawing:

Fig. 1 is a perspective view of a pneumatic tire embodying the invention;

Fig. 2 is a fragmentary plan view of the tread of the tire shown in Fig. 1, but on a larger scale;

Fig. 3 is a view on line 3—3 of Fig. 1, but on a larger scale;

Fig. 4 is similar to Fig. 3 but showing the road contact portion of the tread as it appears under load in service; and Fig. 5 is a section on line 5—5 of Fig. 4.

Referring to the drawing there is shown a tire casing 10 having a body portion 11 and a tread portion 12. The tread comprises a center rib 13, shoulder ribs 14 and 15, and intermediate ribs 16 and 17, there being circumferential grooves 18 between adjacent ribs. Both lateral faces of each rib are formed with serrations comprising contiguous wedge-shape teeth and intermediate notches thus presenting a saw-tooth formation along the edges of the ribs. A series of serrations is formed at the lateral outer sides of the shoulder ribs 14 and 15 and extend for a short distance down the sidewall of the tire in which position they assist in preventing side skidding and improve the traction qualities of the tire. The notches on the lateral inside faces of the ribs are designated as 20. The teeth on the lateral outer side of the ribs 17 and 16 are designated 24 and have sides 22 and 23. The depth and width of the notches 20 and the altitude and width or pitch of the teeth 24 are of a size that the serrations constitute a substantial portion of each rib. The arrangement is such that notches 20 and teeth 24 confront each other. However, the sides of the teeth 24 and the sides of the notches 20 are on different angles with the main central plane of the tire, and accordingly, as will be seen by reference to Figs. 3 and 4, when the tread rubber is not distorted the grooves 18 are of uneven width consisting of a succession of narrow and wide portions, and that when the tread rubber is distorted (see Fig. 4) as when under load that the narrow portions of the grooves close and the apices of the teeth 24 abut the bottoms of the notches 20. It will also be seen that such loading and distorting of the tread rubber is not sufficient to close the wide portion of said grooves. It is the contact between the apices of the teeth 24 and the bottoms of the notches 20 that supports or biases the tread rubber adjacent to the abutting portions against further lateral movement, thus preventing the wide portions of the grooves from closing, thereby presenting tread recesses 9 (see Fig. 4) to the surface of the road.

Considering now the relative shapes of the serrations, it is pointed out that the edges of the serrations on the lateral inside face of the ribs 14, 15, 16, and 17, or the sides of these ribs facing the center of the tire have edges which extend at a greater angle to the great or longitudinal plane of the tire than do edges 22 and 23 of the teeth 24 on the lateral outside of ribs 16 and 17, which is an important feature of the invention. It will be seen that effective traction is afforded by the greater angle formed in the direction of forward skid by the inner edges of the tread ribs, while lateral skid is effectively opposed by the edges 22 and 23 of teeth 24. Since the grooves 18 are retained open at predetermined points under load forming recesses 9 it will be seen that the advantages just recited relative to edges 22 and 23 are not lost when the rubber composing the tread is distorted under its service load.

Since the narrow portions of the grooves close with little lateral distortion of the tread rubber and by closing brace the tread rubber against further lateral movement it will be seen that the present invention provides a stable tread while retaining its effective non-skid qualities.

A tire having a tread constructed as described above is particularly effective as a non-skid tire on wet pavements. The grooves 18 are of such width and depth at their narrow portions that under service load the walls of the grooves at their narrow portions abut except at the bottoms of the grooves which remain open, forming a communicating vent or outlet 25 between the recesses 9. When a tire is run on a wet pavement, unless the tread is designed to permit the escape of water from between the tread and the pavement, a film of water will separate the tread from the pavement with the result of the non-skid or traction qualities of the tire being lost due to the presence of the film of water. A tread embodying the present invention provides recesses 9 into which the water flows permitting the rubber to contact the pavement. The openings or outlets 25 permit the water to flow along the grooves; therefore if the volume of water entering the said recesses is greater than the amount the recesses will hold, the excess water escapes along the grooves of the tread rather than spreading over the surface of the pavement forming a film of water underneath the tread. The outlets 25 also prevent the forming of a vacuum in the recesses 9 which vacuum would result if said recesses were to become shut off from the atmosphere. The prevention of a vacuum in the recesses is of value in avoiding objectionable tire noise, tread wear and power consumption.

It has been found that a quiet tread was produced by placing the above mentioned greater angles of the tread ribs on the inside edges of the ribs rather than on their outside edges. Whatever the true explanation for this reduction of noise may be, it is thought it results, at least in part, from the fact that said greater angle reduces uneven tread wear such as cupping and wiping to a minimum. Uneven tread wear indicates a severe distortion of the edges of non-skid elements and such distortion results in the rubber of the tread snapping back into its molded form as it breaks contact with the road, drawing the edges of non-skid elements of the tread against the road surface. The absence or reduction of this movement in applicant's tire probably is a factor in its quiet characteristic. The combining of serrations of an angle on the outer rib edges with serrations having a greater angle on the inner rib edges is made possible by the present invention which avoids the sounds on one side of a rib being repeated with sounds of the same pitch on the opposite side of the same rib. This arrangement reduces by fifty percent the repetitive sounds which other wise would occur in a tread.

The lateral stability of applicant's tread materially increases the tread mileage since excessive lateral movement of the tread rubber, in contact with the road surface, is avoided, and it is this lateral movement of tread rubber that is a principle factor in tread wear.

Pebbles and the like entering the grooves 18 are ejected by the progressive widening of the grooves at each notch therein. If a large pebble or similar object enters the recess 9, the foreign object will usually be ejected when the recess opens because as the recess opens it is converted from a recess to a notch having a tapered mouth which opens into an open groove thus releasing the rubber's grip on the pebble or the like.

The invention has been illustrated in reference to a nine rib tread tire, but the invention is not to be limited to such a tire as any number of ribs found satisfactory may be used. Other changes and modifications will occur to those familiar with the art; therefore, the invention is to be limited only by the scope of the following claims and the prior art.

What is claimed is:

1. A tire construction comprising a tread portion formed with a plurality of endless circumferential ribs defining intervening grooves of varying width, the lateral faces of said ribs being continuously serrated, the sides of the serrations on one side of the ribs forming greater angles with the forward direction of skid than do the sides of the serrations on the confronting sides of the adjacent ribs, the height and width of said ribs relative to the width of said grooves, and the configuration of the lateral sides of said ribs being such that under normal load in service said ribs distort until their radial outer side portions are in uniformly interrupted lateral abutment.

2. A tire construction comprising a tread portion formed with a plurality of endless circumferential ribs defining intervening circumferential grooves, the lateral faces of said ribs being continuously serrated throughout their length, the teeth and notches of the serrations of confronting sides of said ribs being equal in number and being in meshed relation, the altitudes of the triangles forming the teeth relative to the depth of the notches and the width of said grooves being such that when the tread is under load the apices of the tread teeth abut against the bottom of the notches leaving the portions of said grooves between the said abutting portions unclosed forming recesses with open ends exposed to the road surface.

3. A tire construction comprising a tread portion formed with a plurality of circumferential ribs defining circumferential grooves of varying width, the lateral faces of said ribs being continuously serrated, the sides of the serrations on one side of the ribs forming greater angles with the forward direction of skid than do the sides of the serrations on the confronting sides of the laterally adjacent ribs, the height and width of said ribs relative to the width of said grooves, and the configuration of the lateral sides of said ribs being such that under nominal load in service said ribs distort until their radial outer side portions are in uniformly interrupted lateral abutment.

CHARLES C. DYBVIG.

REFERENCES CITED

The following references are of record in the file of this patent:

UNITED STATES PATENTS

| Number | Name | Date |
|---|---|---|
| 942,567 | Kempshall | Dec. 7, 1909 |
| 2,236,903 | Hale | Apr. 1, 1941 |
| 2,322,505 | Bull | June 22, 1943 |